United States Patent [19]
Claar et al.

[11] Patent Number: 6,041,407
[45] Date of Patent: Mar. 21, 2000

[54] FILE SYSTEM BLOCK SUB-ALLOCATOR

[75] Inventors: Jeffrey Mark Claar, Aliso Viejo; Roger Mather Duvall, Garden Grove; Richard Joseph Oliver, Laguna Beach, all of Calif.

[73] Assignees: Sony Corporation, Tokyo, Japan; Sony Pictures Entertainment, Inc., Culver City, Calif.

[21] Appl. No.: 08/936,566

[22] Filed: Sep. 24, 1997

[51] Int. Cl.[7] ................................................ G06F 9/445
[52] U.S. Cl. ............................ 713/1; 711/111; 714/718
[58] Field of Search ................................. 711/170, 171, 711/172, 173, 111, 4, 112, 113, 209, 3, 144, 156; 713/1, 2, 100; 714/718, 49, 50; 369/54

[56] References Cited

U.S. PATENT DOCUMENTS

| | | | |
|---|---|---|---|
| 4,428,064 | 1/1984 | Hemty et al. ............................. | 364/900 |
| 5,454,103 | 9/1995 | Coverston et al. ....................... | 395/600 |
| 5,455,926 | 10/1995 | Keele et al. ............................. | 711/112 |
| 5,461,719 | 10/1995 | Hosoya .................................... | 395/439 |
| 5,463,762 | 10/1995 | Morrissey et al. ........................ | 714/49 |
| 5,475,814 | 12/1995 | Tomimitsu ................................ | 714/50 |
| 5,568,629 | 10/1996 | Gentry et al. ............................ | 395/441 |
| 5,696,931 | 9/1994 | Lum et al. ................................ | 711/113 |
| 5,717,888 | 2/1998 | Candelaria et al. ...................... | 711/113 |
| 5,761,536 | 6/1998 | Franaszek ................................. | 395/888 |
| 5,784,703 | 7/1998 | Muraoka et al. ......................... | 711/173 |
| 5,845,308 | 12/1995 | Dockser .................................... | 711/3 |

OTHER PUBLICATIONS

International Search Report, PCT/US98/18764, Mar. 12, 1999, 1 pg.

*Primary Examiner*—Joseph E. Palys
*Assistant Examiner*—Rijue Mai
*Attorney, Agent, or Firm*—Blakely, Sokoloff, Taylor & Zafman LLP

[57] ABSTRACT

A system for sub-allocating space within a logical block in a disk-based file system is described. Each disk block is subdivided into an integer number of smaller sub-blocks. One or more of the sub-blocks may contain data samples. Associated with each block is a variable which indicates which sub-block within the block contains data which have been read from disk to memory. When an application performs a read operation, the variable is first checked to determine whether the data sample to be read is already in memory. If the data sample is in memory, no disk read operation for that data is required.

11 Claims, 4 Drawing Sheets

FILE SYSTEM BLOCK SUB-ALLOCATOR

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to the field of computer operating systems, and more particularly to sub-allocating disk space within logical blocks used by disk file systems.

BACKGROUND OF THE INVENTION

Disk based operating systems divide a disk into physical sectors which represent the fundamental units for data storage on the disk. A sector is a portion of the circumference of a track on the disk, and each sector is represented logically as a data storage "block". Since a block represents the minimum logical storage unit for a disk, reading and writing data to a disk involves the use of entire blocks. In general purpose disk file systems, block sizes are usually selected to be small (e.g., 512 bytes/block), in order to minimize the waste of disk space in blocks that are only partially filled with data. Such file systems also attempt to allocate the small blocks in sequential order on the disk, so that large reads and writes to the disk can be performed efficiently. However, as files are created, modified, or deleted, the free space on the disk can quickly become fragmented so that new files are not allocated blocks which are sequential on the disk. One method of reducing file fragmentation is to increase the block size to accommodate larger files.

The use of large block sizes, however, may introduce limitations which affect the disk access performance of the file system. Large block sizes increase the latency for disk transfers since a single read or write operation involves more data during a single operation. If each block is filled with data, single read or write operations may actually increase disk transfer efficiency, since seek times are reduced. If, however, the blocks are not entirely filled with data or are filled with data which is to be accessed more than once by an application program, disk access cycles are wasted during read operations since entire blocks of disk space need to be read, or re-read, from disk into memory in order to access the data. For blocks which contain a small amount of data in relation to the size of the block, data transfer latency can therefore be substantially increased.

It is therefore an intended advantage of the present invention to provide a system for sub-allocating disk space within larger blocks so that data transfer operations are performed only on sections of blocks which contain data which has not previously been read into memory from the disk.

SUMMARY OF THE INVENTION

The present invention discloses a method for sub-allocating space within blocks in a disk based file system so that read operations are performed only on sections of blocks which contain unaccessed data. Logical blocks are subdivided into a number of sub-blocks. A variable is assigned to each sub-divided block, and is configured to maintain the status of each sub-block within the block. If a particular sub-block within the block contains data which has been read to disk, the variable is set to indicate that the sub-block has been accessed.

In one embodiment of the present invention, an application program which performs a read operation from the disk locates the sub-block containing the data to be read. The variable for the block containing the sub-block is then checked to determine whether data within the sub-block has already been transferred from disk to memory. If the data is in memory, the file system returns a message to the application indicating that the read operation is complete. If the data is not in memory, the data is transferred from disk to memory and the variable is set to indicate that the sub-block has been read. A method according to one embodiment of the present invention is particularly useful in systems in which disk caching is not used.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A system for sub-allocating disk space within blocks defined within a file system is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form to facilitate explanation.

Hardware Overview

Figure 1:
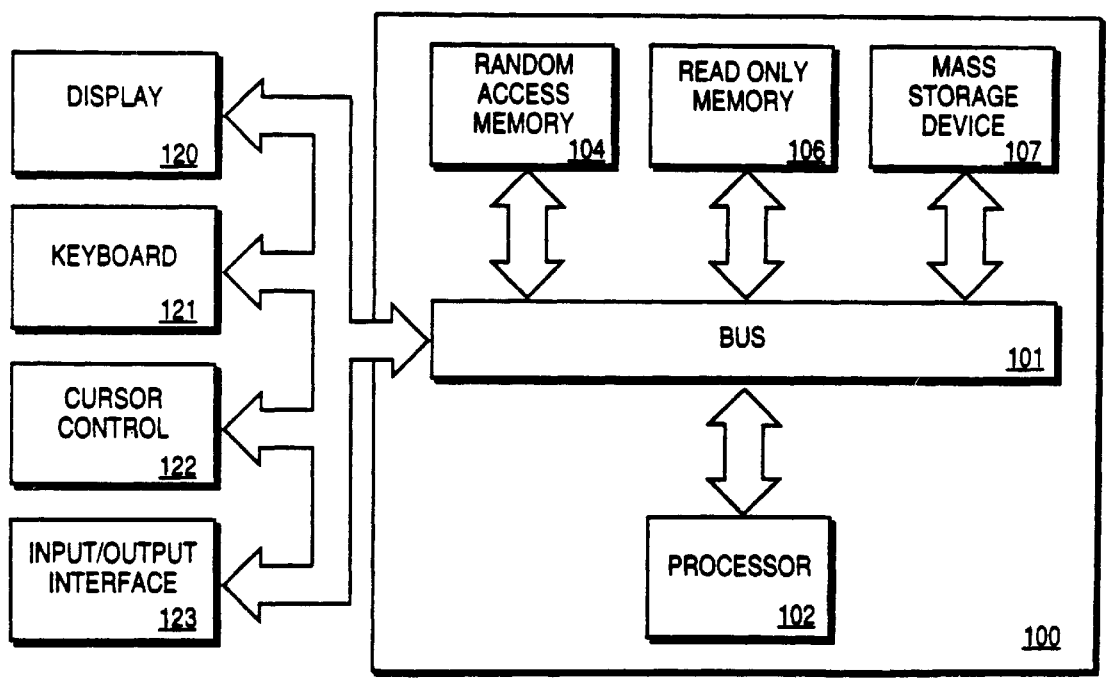
FIG. 1 is a block diagram of a computer system which may be used to implement an embodiment of the present invention.

FIG. 1 illustrates a block diagram of a computer which may be used to implement an embodiment of the present invention. The computer system 100 includes a processor 102 coupled through a bus 101 to a random access memory (RAM) 104, a read only memory (ROM) 106, and display device 120. Keyboard 121 and cursor control unit 122 are coupled to bus 101 for communicating information and command selections to processor 102. Also coupled to processor 102 through bus 101 is an input/output (I/O) interface 123 which can be used to control and transfer data to electronic devices connected to computer 100.

Mass storage device 107 is also coupled to processor 102 through bus 101. Mass storage device 107 represents a memory device which stores data accessible from processor 102 through a block-based file system used by the computer system 100. Mass storage device 107 may be a persistent data storage device, such as a floppy disk drive or a fixed disk drive (e.g., magnetic, optical, magneto-optical, or the like) which can directly access locations on the disk for reading and writing data to and from the disk media. Alternatively, mass storage device 107 could be a tape drive which accesses data sequentially on streaming tape media. It should be noted that the architecture of FIG. 1 is provided only for purposes of illustration, and that a computer used in conjunction with the present invention is not limited to this specific architecture.

Block Sub-Allocation

Disk file systems organize data on disks in logical blocks which represent discrete fixed portions of memory on the disk. Any data stored in a block uses the entire block, even if the data does not completely fill the block. Thus, blocks represent the minimum storage unit on the disk. Most disk file systems select block sizes to be small enough to minimize wasted disk space due to incompletely filled blocks. Small block sizes, however, cause large files to be fragmented among multiple blocks as files are deleted or modified blocks which are freed become occupied by other files. Allocating large block sizes alleviates some of the problems associated with file fragmentation, however, access to specific and small amounts of data within a large block causes increased disk input/output (I/O) cycles and wasted disk space.

A method of one embodiment of the present invention lowers the I/O cycles required disk transfer operations by performing disk read operations only on areas of a file system block which contain data samples rather than on the whole block. The system implements a single-sized block, and internally maintains a variable which records portions of the block have been read from disk into memory. In one embodiment of the present invention, a read operation transfers data from disk to random access memory (RAM) coupled to the system processor (e.g., memory 104 in FIG. 1). However, it should be noted that a read operation used in conjunction with the present invention may transfer data from disk to other types of memory devices or to input/output devices coupled to the processor.

Figure 2:
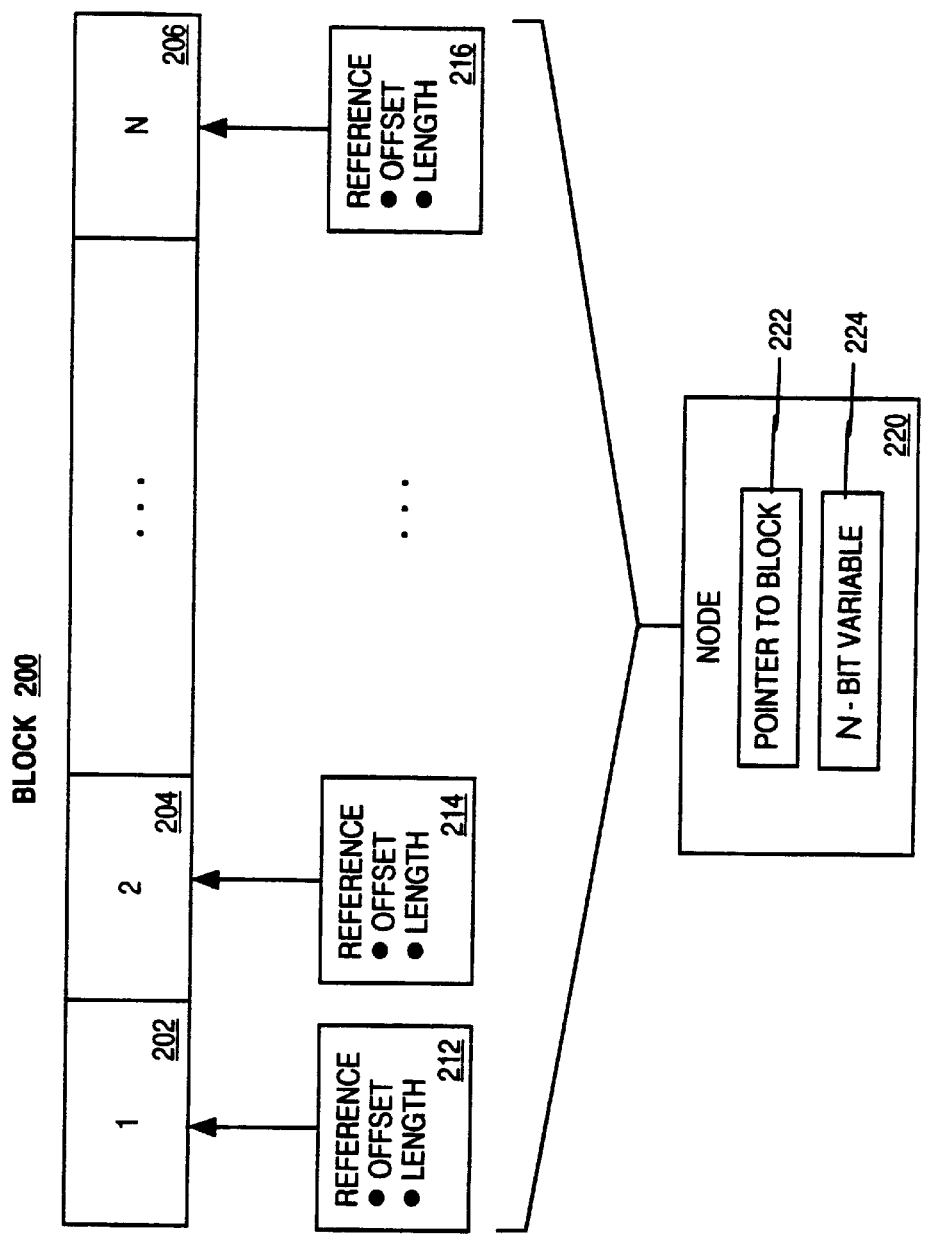
FIG. 2 illustrates the sub-allocation of a block according to one embodiment of the present invention.

FIG. 2 illustrates a method of sub-allocating disk space within large blocks according to one embodiment of the present invention. Block 200 represents a single block on a disk which is used by a file system. Block 200 is divided into a number of sub-blocks, denoted 1-N. Sub-block 202 represents the first sub-block, sub-block 204 represents the second sub-block, and sub-block 206 represents the Nth sub-block. Each sub-block of block 200 is of equal size, thus if block 200 is 32 kbytes, each sub-block is 1 kbyte.

A scheduler process within the file system builds a list of references. Each reference contains an offset and a length which specify the location of data within a block. The offset is a pointer which points to a particular address location within the sub-block pointed to by the register; and the length specifies a number of sequential address locations from the offset address to the end of the data. The length delineates the end of a single file or data sample, and may specify an address in a block other than the block pointed to by the offset. As illustrated in FIG. 2, reference 212 points to data in sub-block 202, reference 214 points to data in sub-block 204, and reference 216 points to data in sub-block 206. References thus point to data within a block, and each block may have several references depending on the amount of data in the block.

According to one embodiment of the present invention, a file system object, referred to as a "node", is associated with each block on the disk. A node contains a pointer to the block to which it is associated, as well as a node variable which specifies the location of data within the block. The node variable contains as many distinct states as there are sub-blocks within the block associated with the node. In FIG. 2, node 220 represents the node associated with block 200. Node 220 contains a pointer 222 to block 200, and node variable 224. Node variable 224 maintains the status of each sub-block within block 200 with respect to which sub-blocks have been read from disk into memory. Thus, if block 200 has been sub-divided into 32 sub-blocks, then variable 224 would be a 32-state variable.

In one embodiment of the present invention, node variables are bit-mask type variables consisting of N-bits which assume either a '1' or '0' value. The number of bits, N, corresponds to the number of sub-blocks within the block. If a sub-block contains data which has been read from disk to memory, a bit corresponding to the location of the sub-block is set to a particular state. The bit could be set to either 0 or 1 to indicate that a sub-block has been read, depending on the default state of the node variable. Alternative embodiments are also contemplated.

Figure 3:
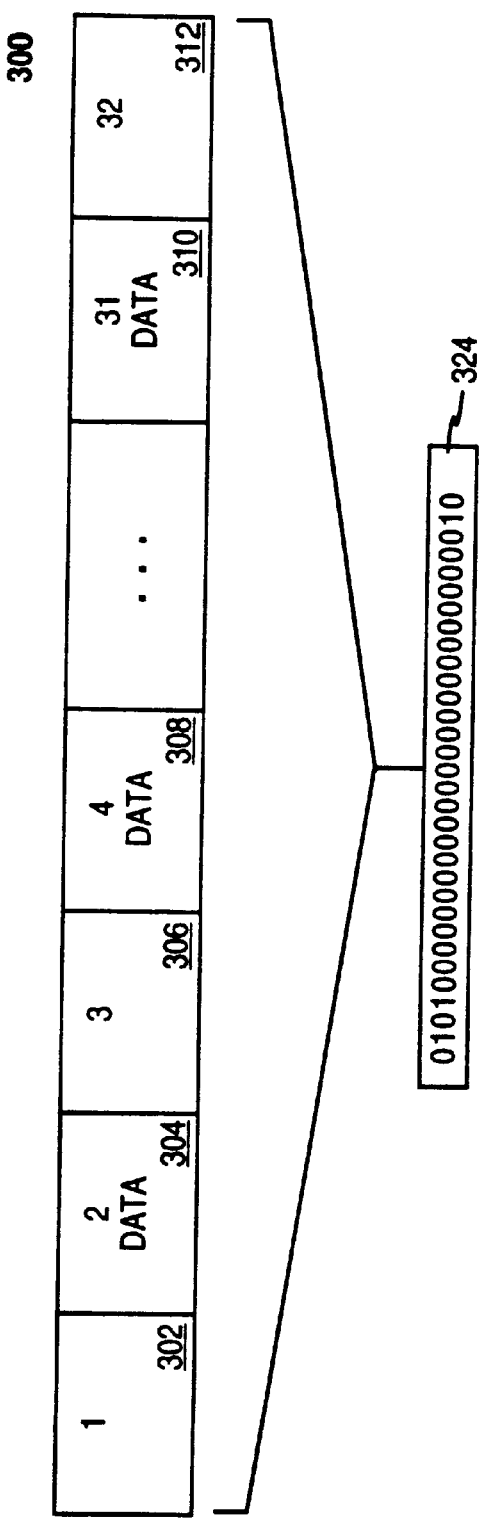
FIG. 3 illustrates an example of a 32-bit node variable assigned to a block subdivided into 32 sub-blocks.

FIG. 3 illustrates the setting of a node corresponding to the location of data within a block. Block 300 is subdivided into 32 sub-blocks, 1–32 and is shown to contain three data samples which have been read into memory. The first sub-block 302 and third sub-block 306 have not been read; the second sub-block 304 and the fourth sub-block 308 each contain data which has been read; and sub-blocks 5–30 (not shown) have not been read. Likewise, the 31st sub-block 310 contains a data sample which has been read, and the 32nd sub-block 312 has not been read.

Node variable 324 represents the variable within the node associated with block 300. Node variable 324 is a 32-bit variable with each bit location representing a corresponding sub-block in block 300. It is assumed that the default state of node variable 324 is all bits initially cleared (i.e., set to 0). Block 300 has data samples in the 2nd, 4th, and 31st sub-blocks which have been read into memory. According to one embodiment of the present invention, bits within the variable are set in the order of the sub-blocks within the block. Therefore, node variable 324 has bits 2, 4, and 31 set to 1, and all other bits in the variable remain set to 0 since the corresponding sub-blocks have not been read into memory.

The location of set bits within the node variable indicate to the file system which sub-blocks within the block have already been read. Therefore, if an application program using the file system required data from a particular sub-block, the file system would first check the status of the variable associated with the sub-block. If the bit for that particular sub-block was set, the file system would simply access memory to retrieve the data rather than perform a read of the sub-block. Thus, the use of sub-blocks and variables indicating the status of each sub-block within a block, prevents the need to read an entire block into memory to access a relatively small amount of data which may be stored in a particular location within the block.

Figure 4:
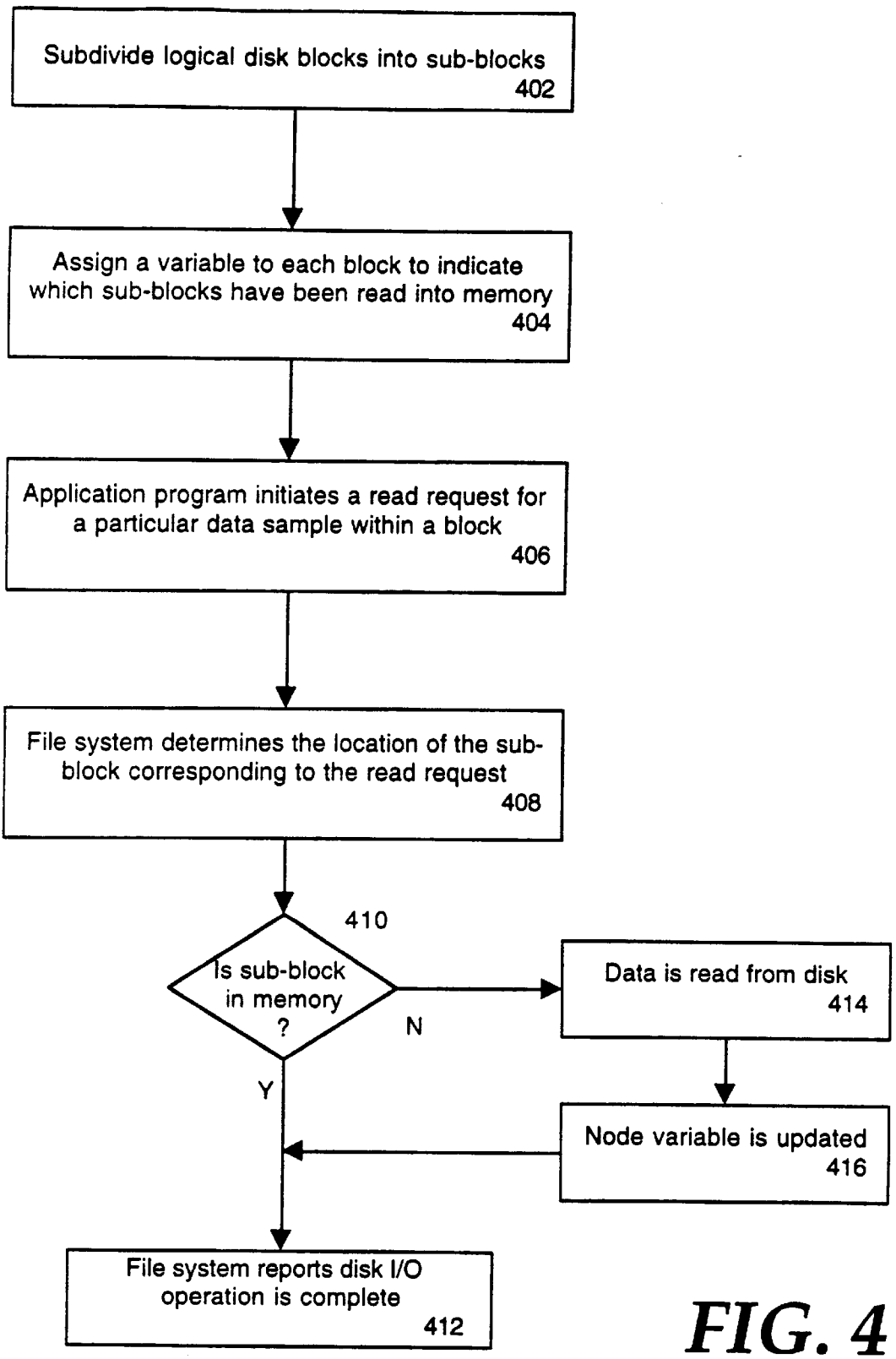
FIG. 4 is a flowchart illustrating the process of sub-allocating a block and maintaining the status of accessed sub-blocks according to one embodiment of the present invention.

FIG. 4 is a flowchart illustrating the steps of performing a read operation with a file system which implements a register and node structure according to the method for one embodiment of the present invention. In step 402 logical blocks on the disk are each subdivided into a number of sub-blocks. A node variable is then assigned to each block to indicate which sub-blocks within the corresponding block contain data which has been read into memory, step 404. In one embodiment of the present invention, the node variable is represented as a N-bit binary word, where N corresponds to the number of sub-blocks within a block.

In step 406, an application program requests to read a particular data sample on the disk. The file system determines the location of the sub-block corresponding to the address specified in the read request using the offset and length values stored in the register which points to the data sample requested, step 408. In step 410 the file system checks the appropriate bit location in the node variable to determine whether the range in the sub-block (in terms of offset and length) is currently in memory. If, in step 410, it is determined that data within the sub-block is in memory, the file system reports that the disk I/O cycle is complete, step 412. However, if it is determined that data in the sub-block is not in memory, the system performs the read operation to transfer the data from sub-block to memory, step 414. When the read operation is complete, the node variable is updated to indicate that the sub-block containing the data sample has been read, step 416. The file system then reports that the I/O cycle is complete, step 412.

One embodiment of the present invention is used in a file system in a computer implemented digital player/recorder which allocates blocks of 32,768 data samples each. These blocks represent the smallest unit of disk space that can be allocated for each sound. When a sound that is only 100 samples long needs to be played, the system has to read the entire 32,768 sample block into memory. This read operation results in 32,668 samples of wasted I/O cycle time. If the application program for which the audio samples are read has minimum disk I/O bandwidth requirements for playback, data samples may very well not be read from the disk within this rate of transfer, due to these wasted I/O cycles. In this case, the audio data played back may be interrupted or otherwise distorted. The use of a 32-bit variable to maintain the status of sub-blocks which have been read into memory, as described in reference to FIG. 3, would reduce the wasted disk I/O cycles for data samples which are read more than once by the application program.

Although the above discussion was written in the context of audio applications, it should be noted that a method of the present invention could be used in other similar applications, such as applications which involve both video and audio content, or applications which involve high-speed calculations on limited amounts of data.

Programming Example

In one embodiment of the present invention, the block sub-allocator is used with a disk-based file system which is implemented as a C++ class. The following C++ program illustrates one method of implementing a block sub-allocator according to one embodiment of the present invention. The following program code, is written in the context of an sound file for a digital player/recorder in which the disk file system allocates blocks of 32,768 samples. When a sound needs to be played, the file system determines the offset and length into a particular block is required to be read. The file system then implements this read by subdividing the block into 32 blocks of 1024 samples each. A 32-bit variable associated with the block indicates which parts of the block have been read.

```
Bool8 SyAudioNode::ReadSynced(UInt32 length) const
Bool8 bRetVal;
if (mBytesPerSample == 1)
{
    bRetVal = (mReadSynced == kAllRead);
}
else
```

```
{
    __ASSERT(length > 0);
    if (mReadSynced == kNoneRead)
    {
        // Nothing has been read - node cannot be read synced.
        bRetVal = FALSE;
    }
    else if (mReadSynced == kAllRead)
    {
        // Everything has been read, so the node must be read synced.
        bRetVal = TRUE;
    }
    else
    {
        // Create mask that fits offset through length.
        UInt32 mask = 0;
        UInt32 nStartBit = 1 << (Offset / kReadSampleSize);
        // Treat offset as if it were aligned on a kReadSampleSize
        // boundary, and increase the length accordingly.
        length += offset % kReadSampleSize;
        // Round up length to kReadSampleSize.
        UInt32 adjust =0 length % kReadSampleSize;
        if (adjust ! = 0)
            length += kReadSampleSize - adjust;
        // Create the mask.
        int nNumBuffers = length / kReadSampleSize;
        while (nNumBuffers-- > 0)
        {
            mask |= nStartBit;
            nStartBit <<= 1;
        }
        // If all bits are toggled, the node is read-synced.
        bRetVal = ((mask & mReadSynced) == mask);
    }
}
return bRetVal;
}
void SyAudioNode::DidReadSync (UInt32 offset, UInt32 length)
{
    // If this is a header node (mBytesPerSample is 1)
    // just set the read synced flag to true.
    if (mBytesPerSample == 1)
    {
        mReadSynced = kAllRead;
    }
    else
    {
        // Must be an offset of 1K samples.
        __ASSERT (offset % kReadSampleSize == 0);
        // And length should be multiple of 1024 samples as well.
        __ASSERT (length % kReadSampleSize == 0);
        offset /= kReadSampleSize;
        UInt32 curBit =1 << offset;
        while (length > 0)
        {
            mReadSynced |= curBit;
            curBit <<=1;
            length -= kReadSampleSize;
        }
    }
}
```

The steps of a method of the present invention may be implemented by a central processing unit (CPU) in a computer executing sequences of instructions stored in a memory. The memory may be a random access memory (RAM), read-only memory (ROM), a persistent store, such as a mass storage device, or any combination of these devices. Execution of the sequences of instructions causes the CPU to perform steps according to the present invention. The instructions may be loaded into the memory of the computer from a storage device or from one or more other computer systems over a network connection. Consequently, execution of the instructions may be performed directly by the CPU. In other cases, the instructions may not be directly executable by the CPU. Under these circumstances, the instructions may be executed by causing the CPU to execute an interpreter that interprets the instructions, or by causing the CPU to execute instructions which convert the received instructions to instructions which can be directly executed by the CPU. In other embodiments, hardwired circuitry may be used in place of, or in combination with, software instructions to implement the present invention. Thus, the present invention is not limited to any specific combination of hardware circuitry and software, nor to any particular source for the instructions executed by the computer.

In the foregoing, a system has been described for sub-allocating space within logical blocks on a disk to reduce wasted read cycles for blocks containing data which has already been read into memory. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of reading data from a disk using a disk-based file system, the method comprising:

subdividing a logical block on said disk into a plurality of sub-blocks;

assigning a variable to said block, said variable configured to maintain the status of each of said plurality of sub-blocks with respect to whether data has been transferred from a particular sub-block to memory;

specifying a location corresponding to data which is to be transferred to said memory from said disk;

testing said variable to determine if said data has been previously transferred to said memory; and transferring said data from said disk to said memory if said data has not been previously transferred to said memory.

2. A method according to claim 1 further comprising setting said variable to indicate that said data has been transferred to said memory after the step of transferring said data.

3. A method according to claim 2 wherein said variable is an N-bit digital variable, and wherein N corresponds to the number of said plurality of sub-blocks.

4. A method according to claim 3 wherein said N-bit digital variable is a bit-mask variable, and wherein successive bits of said bit-mask correspond to successive sub-blocks of said plurality of sub-blocks, such that each bit corresponds to a single sub-block of said plurality of sub-blocks.

5. A method according to claim 4 wherein a bit of said bit-map variable is set to a logical one if data within a sub-block corresponding to said bit has been transferred into memory.

6. An apparatus for transferring data from a disk using a disk-based file system, the apparatus comprising:

means for subdividing a logical block on said disk into a plurality of sub-blocks;

means for assigning a variable to said block, said variable configured to maintain the status of each of said plurality of sub-blocks with respect to whether data has been transferred from a particular sub-block to memory;

means for specifying a location corresponding to data which is to be transferred to said memory from said disk;

means for testing said variable to determine if said data has been previously transferred to said memory; and means for transferring said data from said disk to said memory if said data has not been previously transferred to said memory.

7. The apparatus according to claim 6 further comprising means for setting said variable to indicate that said data has been transferred to said memory after the step of transferring said data.

8. A computer readable medium having stored thereon sequences of instructions which are executable by a processor, and which, when executed by the processor, cause the processor to perform:

subdividing a logical block on a disk used by a file system into a plurality of sub-blocks;

assigning a variable to said block, said variable configured to maintain the status of each of said plurality of sub-blocks with respect to whether data has been transferred from a particular sub-block to memory;

specifying a location corresponding to data which is to be transferred to said memory from said disk;

testing said variable to determine if said data has been previously transferred to said memory; and transferring said data from said disk to said memory if said data has not been previously transferred to said memory.

9. A computer readable medium according to claim 8 further containing instructions which cause the processor to perform setting said variable to indicate that said data has been transferred to said memory after the step of transferring said data.

10. A method of indicating the status of disk read operations, the method comprising:

subdividing a logical block on said disk into a plurality of sub-blocks;

defining a variable assigned to said logical block, said variable comprising a plurality of bit locations, each bit location of said plurality of bit locations corresponding to a sub-block of said plurality of sub-blocks;

assigning a first logical value to each of said plurality of bit locations for which data in corresponding sub-blocks has been transferred from said disk to a memory; and assigning a second logical value to each of said plurality of bit locations for which data in corresponding sub-blocks has not been transferred from said disk to said memory.

11. A computer system comprising:

a bus;

a data storage device coupled to said bus; and a processor coupled to said data storage device, said processor operable to receive instructions from the data storage device which, when executed by the processor, cause the processor to perform:

subdividing a logical block on said data storage device used by a file system into a plurality of sub-blocks;

assigning a variable to said block, said variable configured to maintain the status of each of said plurality of sub-blocks with respect to whether data has been transferred from a particular sub-block to memory;

specifying a location corresponding to data which is to be transferred to said memory from said data storage device;

testing said variable to determine if said data has been previously transferred to said memory; and transferring said data from said disk to said memory if said data has not been previously transferred to said memory.

* * * * *